United States Patent [19]

Miyake

[11] 4,275,933
[45] Jun. 30, 1981

[54] ANTISKID DEVICE

[75] Inventor: Katsuya Miyake, Ageo, Japan

[73] Assignee: Akebono Brake Industry Co. Ltd., Tokyo, Japan

[21] Appl. No.: 28,443

[22] Filed: Apr. 9, 1979

Related U.S. Application Data

[63] Continuation of Ser. No. 828,172, Aug. 26, 1977, abandoned.

[30] Foreign Application Priority Data

Sep. 6, 1976 [JP] Japan ................................ 51-106450

[51] Int. Cl.³ .......................... B60T 8/02; B60T 13/68
[52] U.S. Cl. .................................... 303/106; 303/109; 303/110; 303/119
[58] Field of Search ................... 188/181; 303/20, 103, 303/105, 106, 109, 110, 115, 119; 361/238; 340/53, 62

[56] References Cited

U.S. PATENT DOCUMENTS

| | | |
|---|---|---|
| 3,610,703 | 10/1971 | Slavin et al. .......................... 303/106 |
| 3,883,187 | 5/1975 | Carp et al. .......................... 303/109 |
| 3,955,854 | 5/1976 | Marouby .............................. 303/109 |

FOREIGN PATENT DOCUMENTS

2434918  2/1975  Fed. Rep. of Germany ........... 303/110

*Primary Examiner*—J. D. Miller
*Assistant Examiner*—Reinhard J. Eisenzopf
*Attorney, Agent, or Firm*—Toren, McGeady and Stanger

[57] ABSTRACT

An antiskid device which causes braking pressure to decrease when wheel velocity suddenly drops during a braking operation on a vehicle and then allows the braking pressure to increase upon restoration of the wheel velocity. The antiskid device is equipped with a circuit for producing a tracking acceleration signal VT1 which increases at a predetermined rate from a minimum value of wheel velocity during a recovering process of the wheel velocity and also with a comparator which compares the wheel velocity Vw with the tracking acceleration signal VT1. The braking pressure is allowed to quickly increase when the comparator is in operation.

5 Claims, 4 Drawing Figures

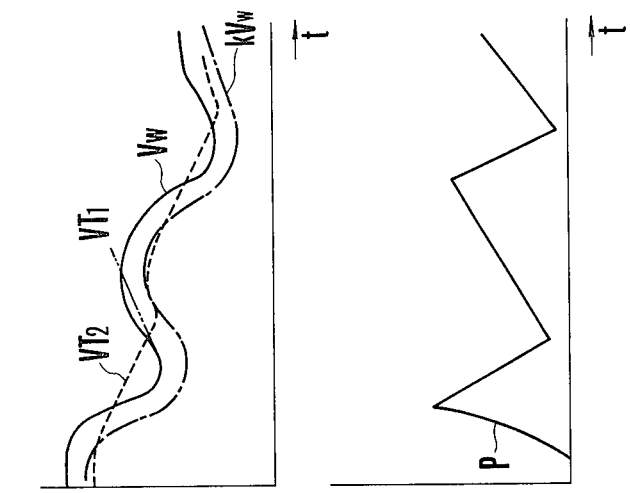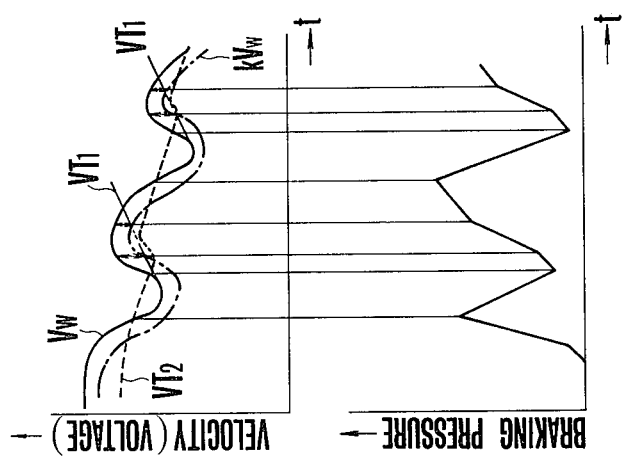

ANTISKID DEVICE

This is a continuation of application, Ser. No. 828,172 filed Aug. 26, 1977 and now abandoned.

BACKGROUND OF THE INVENTION

This invention relates to an improvement in an antiskid device for preventing wheels from falling into a skidding state when a brake is applied to a vehicle.

In such an antiskid device in general, braking pressure is caused to decrease when a sudden drop is detected in wheel velocity and then is allowed to increase upon restoration of the velocity of the rear wheels. Such braking pressure decreasing and increasing control in general has been accomplished with a power piston which is applied by a differential pressure between two air chambers. However, such a conventional method has the following drawbacks:

It is preferable to immediately effect reduction in braking pressure for preventing wheels from skidding and then to increase the braking pressure according to the status of restoration of wheel velocity. However, in the case of a conventional control method which has only one rate of increasing the braking pressure, such control cannot be accomplished according as whether or not an engine brake action which makes a great difference in the moment of inertia of a rotating body (hereinafter engine brake or no engine brake will be expressed as on or off actions of a clutch). Therefore, when the braking pressure increasing rate is arranged to be suitable for a clutch-on condition, the braking distance under a clutch-off condition becomes longer. Then, in cases where the braking pressure increasing rate is arranged to be suitable for a clutch-off condition, premature locking tends to take place under a clutch-on condition. On the other hand, in a conventional antiskid device where two rates of increasing the brake pressure are used as disclosed in U.S. Pat. No. 3,494,671, the brake pressure is controlled by use of the wheel acceleration so that the device is often erroneously operated by the noise signal contained in the wheel speed signal. The present invention is directed to the solution of such problems of the conventional antiskid devices.

SUMMARY OF THE INVENTION

It is therefore a principal object of this invention to provide an antiskid device wherein a tracking acceleration signal is set to increase its value, at a predetermined rate, from a value corresponding to the lowest value of wheel velocity during a process of recovery of the wheel velocity after a sudden drop thereof; when the actual recovery of vehicle velocity is faster than this tracking acceleration signal, prolongation of braking distance is prevented by allowing the braking pressure to increase quickly; and, when the actual recovery of vehicle velocity is less than the tracking acceleration signal, premature locking is prevented by more slowly increasing the braking pressure.

The above and further objects, features and advantages of this invention will become apparent from the following detailed description of a preferred embodiment of this invention taken in connection with the accompanying drawings.

BRIEF DESCRIPTION OF THE DRAWINGS

All of the accompanying drawings illustrate an embodiment of this invention.

FIGS. 2(A) and 2(B) illustrate characteristics of wheel velocity and braking pressure.

DETAILED DESCRIPTION OF PREFERRED EMBODIMENT

Figure 1:
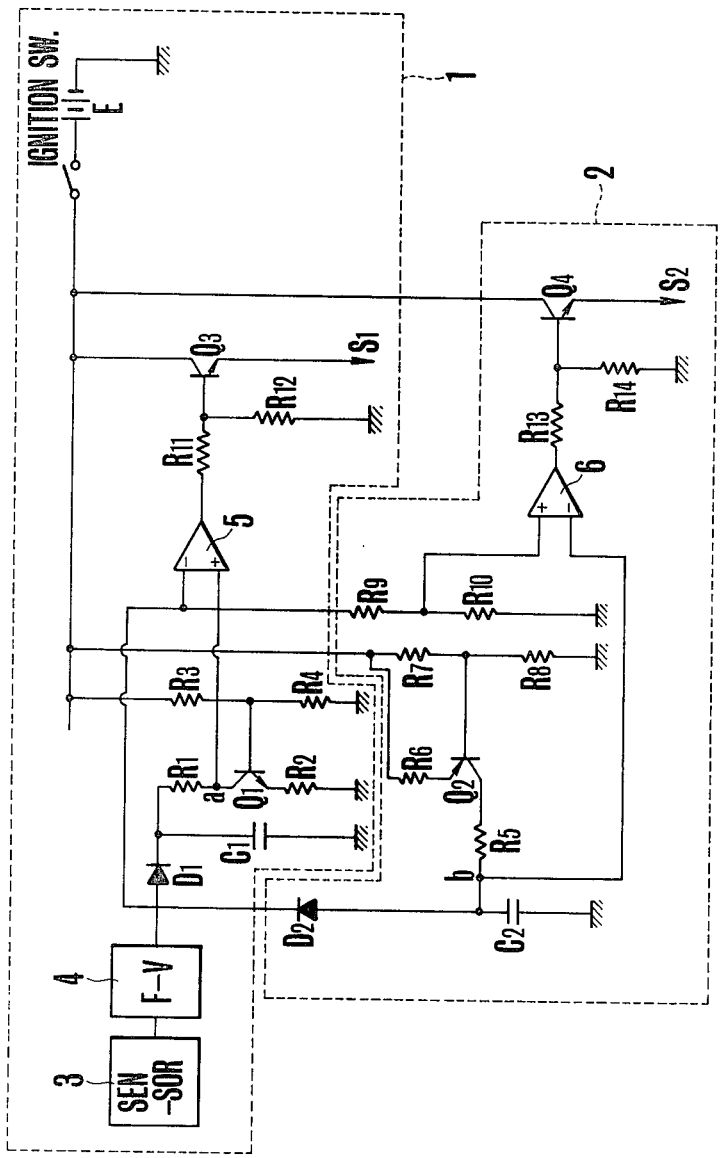
FIG. 1 is a control circuit diagram of the antiskid device of this invention.

Referring to FIG. 1 which illustrates an antiskid control circuit of this invention, a block 1 represents, by way of an example, a known circuit which produces a braking pressure decreasing signal S1 upon detection of a sudden drop in wheel velocity; and another block 2 represents a novel circuit of this invention producing a braking-pressure quick increasing signal S2 when the wheel velocity is being quickly increased in a process of recovery thereof. In the circuit 1, a reference numeral 3 indicates a speed sensor; and 4 indicates a F-V converter (a frequency-to-voltage converter) which produces a wheel velocity signal $V_w$ by converting a frequency signal received from the speed sensor 3 into a voltage signal. The highest value of the wheel velocity signal $V_w$ is stored in a capacitor C1. The voltage of the capacitor C1 is then discharged through a constant current circuit consisting of a transistor Q1 and resistances R1 through R4 and being arranged to gradually decrease the voltage of the capacitor C1. Then, a tracking deceleration signal $V_{T2}$ is produced at a point a. The tracking deceleration signal $V_{T2}$ and the actual wheel velocity signal $V_w$ are compared with each other by a comparator 5. When the result of comparison becomes $V_{T2} > V_w$, a braking pressure decreasing signal S1 is produced. The production of the signal S1 is discontinued upon recovery of the wheel velocity $V_w$ and when there obtains a state of $V_{T2} < V_w$.

The relation described above is illustrated in FIGS. 2(A) and 2(B) with the wheel velocity $V_w$ shown by full lines and the tracking deceleration signal by broken lines.

Referring now to the circuit 2 shown in FIG. 1, the voltage of a capacitor C2 is decreased simultaneously with reduction in the wheel velocity signal $V_w$ by a diode D2 and the capacitor C2. Then, when the wheel velocity signal $V_w$ comes to a recovering stage, the lowest value of the wheel velocity signal $V_w$ is stored in the capacitor C2. After that, the voltage of the capacitor C2 is caused by a constant current circuit consisting of a transistor Q2 and resistances R6-R8 to gradually increase at a fixed rate determined by a time constant $(R6+R5)C2$; and a tracking acceleration signal $V_{T1}$ which rises linearly with respect to time is produced at a point b. A comparator 6 compares the tracking acceleration signal $V_{T1}$ with a reduced wheel velocity signal $kV_w$ which is obtained by dividing the wheel velocity signal $V_w$ by resistances R9 and R10 to produce a braking pressure quick increasing signal S2.

The relation described in the foregoing is as illustrated in FIGS. 2(A) and 2(B) with the reduced wheel velocity signal $kV_w$ indicated by an alternate long and short dash line and the tracking acceleration signal $V_{T1}$ by an alternate long and two short dashes line.

Figure 3:
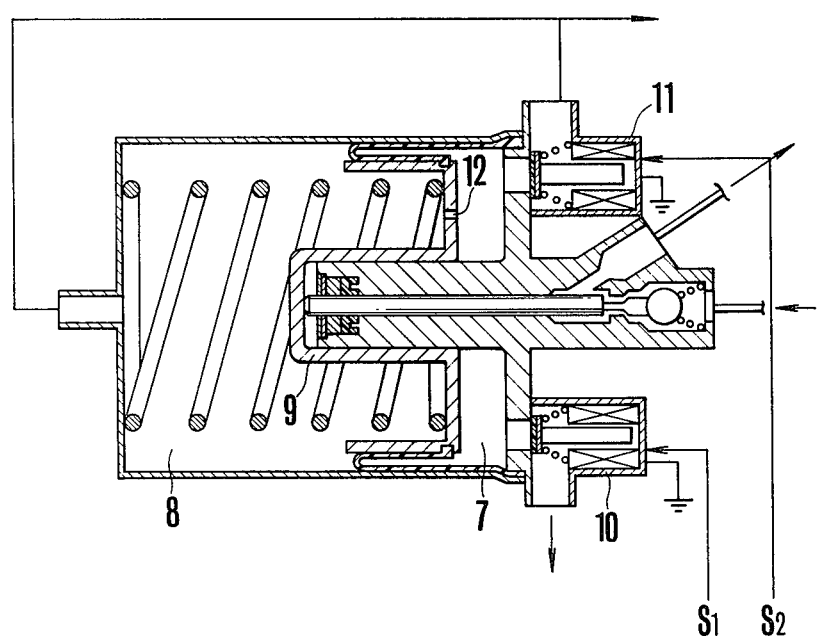
FIG. 3 is a sectional view of a pressure reducing device.

An example of a pressure reducing device that accomplishes an increasing and decreasing control over braking pressure by means of signals S1 and S2 obtained from such a control circuit is as illustrated in FIG. 3.

Referring to FIG. 3, the braking pressure is decreased when a power piston 9 which separates a high pressure air chamber 7 and a low pressure air chamber 8 from each other is caused to move to the left as viewed in FIG. 3 by a differential pressure between the air chambers 7 and 8. Then, when the differential pressure decreases, the piston comes to move back to the right as viewed in FIG. 3 thereby to effect increase in the braking pressure. A first solenoid valve 10 is operated by a braking pressure decreasing signal S1 to allow a high pressure (for example, an atmospheric pressure) to flow into the high pressure chamber 7 to increase the differential pressure between the two air chambers 7 and 8. Meanwhile, a second solenoid valve 11 is operated by the signal S2 to allow a low pressure source (such as an intake manifold of an engine) which is communicating with the low pressure chamber 8 to come to communicate with the high pressure chamber 7.

The other construction details of the pressure reducing device is about the same as in a known pressure reducing device and, under a normal condition, decrease in the differential pressure between the two chambers 7 and 8 is arranged to be effected by an orifice 12 provided in the power piston 9.

With an antiskid device arranged as described in the foregoing, braking pressure is eased down to prevent wheels from falling into a skidding state under a braking operation; and then increase in the braking pressure is controlled to be effected either slowly or quickly according to the recovering status of wheel velocity.

In other words, under a condition where a clutch is in connection and accordingly an engine brake is in effect, the recovering status of wheel velocity is slow. Under such a condition, therefore, the reduced wheel velocity signal kVw is always lower than the tracking acceleration signal VT1 as shown in FIG. 2(B) and there is produced no signal S2; and then the increase in the braking pressure takes place only at a slower rate which is governed by the orifice 12 of the pressure reducing device.

On the other hand, under a condition where a clutch is disconnected and accordingly engine brake is not in effect, the recovery of the wheel velocity signal Vw is speedy and the reduced wheel velocity signal kVw becomes higher than the tracking acceleration signal VT1 as shown in FIG. 2(B); then, the signal S2 is produced to open the second solenoid valve 11 of the pressure reducing device; and, during such operation of the solenoid valve 11, the power piston 9 moves to the right at a high speed to effect a quick increase of the braking pressure.

The method for setting a time for producing the braking pressure decreasing signal S1 and a time for shutting it off described in the foregoing is given by way of an example only. Other known methods may be employed in place of such a method to attain the same purpose. A subject matter of this invention lies in that the actual wheel velocity is compared with the tracking acceleration signal; and, when the two reach a predetermined relation, or in other words, when wheel velocity has been recovered to an excessive degree, the braking pressure is allowed to quickly increase to prevent increase in braking distance.

As described in the foregoing, the invented antiskid device is capable of controlling the braking pressure to increase in a suitable manner according to the recovering status of wheel velocity. According to the present invention, the brake pressure is controlled without use of the wheel acceleration such as in U.S. Pat. No. 3,610,703, there is caused no erroneous operation due to the noise signal contained in the wheel speed signal. The invention is thus highly advantageous because of a great improvement in braking safety for vehicles.

What is claimed is:

1. An anti-skid device for a vehicle comprising:
    a wheel velocity signal producing circuit for detecting a wheel velocity and producing a signal corresponding to the wheel velocity;
    a wheel skidding detection circuit for producing a braking pressure decrease signal when skidding of a wheel takes place and then cutting off the production of the braking pressure decrease signal upon restoration of the wheel velocity;
    an increasing signal producing circuit for producing a reference acceleration signal which increases linearly from an initial voltage corresponding to the minimum wheel velocity during time after the restoration of wheel velocity, and which is isolated from the signal corresponding to the wheel velocity;
    a comparator circuit for comparing the signal corresponding to wheel velocity with the reference acceleration signal and for producing a signal for modifying the brake pressure increase when the wheel velocity signal exceeds a predetermined relation to the reference acceleration signal and for cutting off the brake pressure modifying signal when the wheel velocity signal has less than the predetermined relationship to the reference acceleration signal; and
    a pressure reducing device for decreasing the braking pressure in response to the braking pressure decrease signal, increasing the brake pressure of a first rate upon the restoration of wheel velocity, and increasing the brake pressure with a second set brake pressure increase rate higher than a first brake pressure increase rate in response to the output of the brake pressure modifying signal from the comparator circuit.

2. An anti-skid device according to claim 1, wherein the increasing signal producing circuit comprises a capacitor for holding the minimum value of the wheel velocity signal voltage and a circuit which charges the capacitor with a constant current.

3. An anti-skid device according to claim 2, wherein a diode connects the capacitor to the wheel velocity signal producing circuit, and the capacitor is discharged through the diode while the wheel velocity signal voltage is decreasing.

4. An anti-skid device according to claim 3, wherein one of the inputs to the comparator circuit is the wheel velocity signal voltage which has been reduced by a constant rate, and the other input is a terminal voltage of the capacitor.

5. An anti-skid device according to claim 4, wherein the comparator circuit is arranged to produce a signal for rapidly increasing the brake pressure when the wheel velocity signal voltage which has been reduced by a constant rate is higher than the terminal voltage of the capacitor.

* * * * *